United States Patent Office 3,446,831
Patented May 27, 1969

3,446,831
ESTERS OF 1,1,3,3-TETRAMETHYLBUTYL HYDROPEROXIDE
Orville Leonard Mageli and Douglas John Bolton, Buffalo, N.Y., assignors to Wallace & Tiernan Inc., East Orange, N.J., a corporation of Delaware
No Drawing. Filed Nov. 9, 1966, Ser. No. 592,988
Int. Cl. C07c 69/22, 73/10
U.S. Cl. 260—453                    6 Claims

ABSTRACT OF THE DISCLOSURE

Organic peroxyesters, initiators for the polymerization of ethylenically unsaturated monomers, having the general formula:

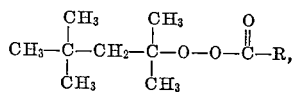

where

R is an alkyl radical, branched at the alpha carbon, having from 3 to 20 carbon atoms, are disclosed. These novel compounds are especially useful in curing unsaturated polyester resins, and in the polymerization of styrene and vinyl chloride.

---

The present invention relates to certain ester derivatives of 1,1,3,3-tetramethylbutyl hydroperoxide and their utilization as initiators in polymerization reactions. This invention is particularily directed to branched chain alkyl peroxyesters branched at the α carbon atom.

The novel compounds of this invention have the general formula:

(I)

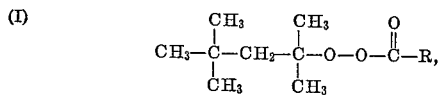

wherein: R is an alkyl radical, branched at the alpha carbon position, having from 3 to about 20 carbon atoms.

The acetate ester (R in (I) is methyl) is known compound, disclosed by Fuest (Ph. D. thesis, Rutgers (1963), University Microfilms, Inc., Ann Arbor, Mich. at pages 19–20) and by Acott and Beckwith, Australian Journal of Chemistry 17, 1350, 1352 (1964).

Other publications of interest in the general area of peroxyester preparation are Milas, U.S. Patent No. 2,567,615 issued Sept. 11, 1951, and Dickey, Canada Patent No. 534,709 issued Dec. 18, 1956. Of interest with respect to peroxyester groups having an α-branched carbon is Leveskis U.S. Patent No. 3,264,274 issued Aug. 2, 1966.

It has been discovered that the α-branched ester derivatives of 1,1,3,3-tetramethylbutyl hydroperoxide, are significantly more active, and more efficient initiators for polymerization reactions, exemplified herein by the curing of unsaturated polyester resins, and the polymerization of the ethylenically unsaturated monomers styrene and vinyl chloride, than the previously known compounds such as, t-butylperoxy-2-ethylhexanoate, and 2,5-dimethylhexane-2,5-di(peroxy-2-ethylhexanoate.)

For convenience 1,1,3,3 - tetramethylbutyl hydroperoxide, hereinafter referred to as TMBH, is shown structurally below:

(II)

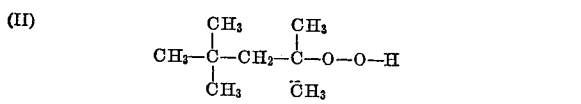

The compounds of the invention have been defined at Formula I above. The radical R in Formula I is either a secondary or a tertiary group shown as, (III)

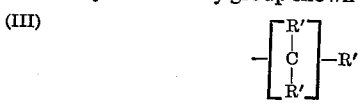

where R' is hydrogen or alkyl, and C is the carbon atom attached directly to the carboxyl group, i.e., the α carbon atom. Also not more than one R' may be hydrogen. The total number of carbon atoms in (III) being from 3 to about 20, more commonly from 3 to about 12.

When the radical R is secondary, shown by,

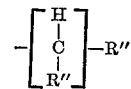

R'' is an alkyl radical having from 1 to about 10 carbon atoms.

When the radical R is tertiary, a preferred group is shown by

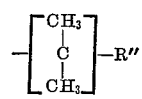

where R'' is an alkyl radical having from 1 to about 10 carbon atoms.

Illustrative of ester groups, i.e.

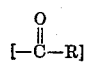

are: isobutyrate, 2 - ethylbutyrate, pivalate (neopentanoate), 2-methylpentanoate, 2-ethylhexanoate, neoheptanoate, neodecanoate, neotridecanoate.

Typical examples of compounds falling within the scope of the invention are:

1,1,3,3-tetramethylbutyl peroxyisobutyrate
1,1,3,3-tetramethylbutyl peroxy-2-ethylbutyrate
1,1,3,3-tetramethylbutyl peroxypivalate
1,1,3,3-tetramethylbutyl peroxy-2-methylpentanoate
1,1,3,3-tetramethylbutyl peroxy-2-ethylhexanoate
1,1,3,3-tetramethylbutyl peroxyneoheptanoate The compounds of the invention may be readily prepared by the procedures disclosed in the aforementioned Milas and Dickey patents.

PREPARATIONS

Example 1.—1,1,3,3-tetramethylbutyl peroxyisobutyrate (IV)

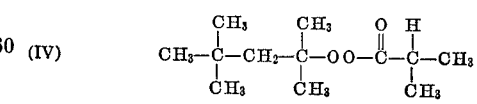

308 grams of 20% aqueous KOH (1.1 moles) were added to a reactor equipped with a stirrer, thermometer and means for cooling the contents. After cooling the KOH solution to 15° C., 161 grams of 90% TMBH (1.0 mole) were added with stirring while maintaining the temperature at 15° C. After an additional 10 minutes stirring at 15° C., the reaction mixture was cooled below about 5° C., and the addition of 107 grams of isobutyryl chloride (1.0 mole) was begun; this same temperature was maintained during the addition. The reaction mixture was then stirred another 1½ hours during which time the temperature was allowed to reach 15° C. The aqueous layer was separated and the organic layer was washed two times with a solution of sodium sulfite and then was washed with water. The reaction product was then dried over anhydrous magnesium sulfate, and a 88% yield of a colorless liquid was obtained.

Active oxygen analysis.—Found: 7.37%. Theoretical: 7.41%.

The structural formula of this product is necessarily that shown under Example IV above, as proven by infrared analysis and the active oxygen determination.

Examples 2–5

Using the method of Example 1 and the appropriate acid chloride the following esters of TMBH were prepared.

| Example No. | Peroxy ester | Yield, percent | Percent active oxygen Found | Percent active oxygen Theoretical |
|---|---|---|---|---|
| 2 | -pivalate | 90 | 6.42 | 6.96 |
| 3 | -2-methyl pentanoate | 78 | 5.54 | 6.55 |
| 4 | -2-ethyl hexanoate | 93 | 5.75 | 5.87 |
| 5 | -2-ethyl butyrate | 78 | 6.51 | 6.55 |

The above compounds all were also shown to have the desired structures by an examination of their infrared spectra.

POLYMERIZATION

According to the present invention there is provided an improved process for the preparation of normally solid polymers or copolymers of ethylenically unsaturated monomers, by contacting the monomers with sufficient α branched ester of TMBH, as polymerization initiator, at suitable temperatures and pressures to effect the polymerization.

It has been observed that the novel compounds of the present invention are efficient initiators for the polymerization and copolymerization of ethylenically unsaturated monomers such as: alkenes, vinyl halides, vinyl esters, vinyl nitriles, vinylidene halides, and alkenyl aromatic (including substituted alkenyl aromatic). Typical of such monomers are ethylene, vinyl chloride, vinyl acetate, acrylonitrile, vinylidene chloride, styrene, chlorostyrene, and alpha methylstyrene.

It has been especially observed that the novel compounds of the present invention are significantly more active initiators in the polymerization or curing of that particular group of ethylenically unsaturated monomers commonly called unsaturated polyesters resins.

(i) *Styrene polymerization.*— Since the closest analogous compounds to the peroxyesters of this invention are the α branched 2,5-dimethylhexane-2,5-diperoxyesters, and, t-butyl peroxyesters, a comparison was made with a representative compound of each of these, to indicate the improvement possible in polymerization rates when using the novel initiators of this invention.

Conventional dilatometry was used to measure the rate of polymerization of styrene at 50° C.

To 1 deciliter (dl.) of styrene at 0° C. was added $9.54 \times 10^{-4}$ moles/dl. of the particular peroxyester initiator. The solution was placed in a calibrated dilatometer and the polymerization conducted at the 50° C. The rates of polymerization at 5% conversion, and the efficiency ratios were then calculated; these are set out in Table I below.

TABLE I.—POLYMERIZATION OF STYRENE

| Peroxyester | Rate of polymerization | Efficiency rate [2] |
|---|---|---|
| (A) 1,1,3,3-tetramethylbutyl (peroxypivalate). | M/l/min.,[1] $3.97 \times 10^{-3}$ | 1.09 |
| (B) 2,5-dimethylhexane-2,5-di (peroxypivalate). | $3.4 \times 10^{-3}$ | 0.81 |
| (C) t-Butyl peroxypivalate | $2.6 \times 10^{-3}$ | 1.00 |

[1] M/l/min.=moles per liter per minute.
[2] Calculated assuming t-butyl peroxypivalate has an efficiency of 1.0.

(ii) *Vinyl chloride polymerization.*—The α branched peroxyesters were compared as initiators in the polymerization of vinyl chloride using the well known bottle polymerization technique at autogenous pressures. The formulation used in the evaluation is:

| | |
|---|---|
| Vinyl chloride monomer | g 100 |
| Water (distilled) | ml 210 |
| Methocel (1500 cps.) (1% solution) | ml 20 |
| Sorbitan monostearate (1% solution) | ml 10 |
| Polyoxyethylene sorbitan monstearate (1% solution) | ml 10 |
| Initiator | variable. |

The polymerization procedure used follows:

A water suspension was prepared as set out in the above formulation, and added to a 24 ounce beverage bottle which was then frozen at −20° C. A series of bottles was prepared and the desired amounts of peroxide initiators were then added, followed by the freshly distilled vinyl chloride. The bottles were capped, and placed in a thermostatted water bath equipped to cause the rotation of the bottles end over end. After the polymerization had continued at the desired temperature for a specified time, the bottles were cooled, vented off polyvinyl chloride determined gravimetrically.

A comparison of 1,1,3,3-tetramethylbutyl peroxy pivalate with t-butyl peroxy pivalate was made using the above procedure at 50° C. for 16 hours.

It was determined in this experiment that 0.032 phr. (parts per hundred parts of monomer) of the TMBH pivalate ester and 0.039 phr. of a t-butyl peroxy pivalate gave equal percentage conversion to polyvinyl chloride. Other work evaluating 2,5-dimethyl hexane-2,5-di(peroxy pivalate) indicates that this initiator falls between the TMBH pivalate ester and t-butyl peroxy pivalate in efficiency in vinyl chloride polymerization.

(iii) *Unsaturated polyester polymerization.*—Polymerization tests were carried out using the "S.P.I. Procedure for Running Exotherm Curves-Polyester Resins"— published in the Preprint of the 16th Annual Conference— Reinforced Plastics Division Society of the Plastics Industry, Inc. February 1961.

Certain of the tests were run in a general purpose "Standard" resin having the following formulation.

| | |
|---|---|
| Maleic anhydride | moles 1.0 |
| Phthalic anhydride | do 1.0 |
| Propylene glycol | do 2.2 |
| Acid number of alkyd resin | 35–45 |
| Inhibitor (hydroquinone) (percent of final solution) | percent 0.013 |
| Styrene monmer (percent of final solution) | do 30 |

A series of additional exotherm tests were run in a number of commercially available unsaturated polyester resins to further confirm the discovery of the substantially increased activity of the compounds of this invention in polyester curing.

Data comparing α-branched esters of TMBH, 2,5-dimethyl hexane-2,5-dihydroperoxide (2,5-H), and t-butyl hydroperoxide (t-B H), are set out in the following tables.

For reasons of clarity and brevity, the rather lengthy chemical names of these ester derivatives will be abbreviated hereinafter in the tables of exotherm data as:

TABLE II.—ABBREVIATIONS OF PEROXYESTER DERIVATIVES

| Ester | Derivative of— | | |
|---|---|---|---|
| | TMBH | 2,5-H | t-B-H |
| -isobutyrate | TMB-IB | 2,5-IB | t-B-IB |
| -2-ethylbutyrate | TMB-EB | 2,5-EB | t-B-EB |
| -2-ethyl hexanoate | TMB-EH | 2,5-EH | t-B-EH |
| -2-methyl pentanoate | TMB-MP | 2,5-MP | t-B-MP |
| -pivalate | TMB-P | 2,5-P | t-B-P |

In the exotherm tests recorded in Table III, each of the various peroxyesters was used in an amount calculated to give an active oxygen content equivalent to that obtained with 1% by weight of benzoyl peroxide. This was done in order to provide a practical basis for the evaluation of the compounds of the invention with the prior art peroxyesters, as benzoyl peroxide is well known as the standard initiator (catalyst) for the polyester industry.

TABLE III.—180° F.-EXOTHERM DATA
[Standard Resin]

| Peroxyester | Gel time, minutes | Cure time, minutes | Peak exotherm, °F. |
|---|---|---|---|
| t-B-IB | 6.9 | 9.2 | 379 |
| 2,5-IB | 4.7 | 6.4 | 400 |
| TMB-IB | 3.1 | 4.3 | 402 |
| t-B-EB | 4.4 | 5.9 | 400 |
| 2,5-EB | 3.2 | 4.5 | 404 |
| TMB-EB | 1.7 | 2.4 | 396 |
| t-B-EH | 4.0 | 5.6 | 393 |
| 2,5-EH | 2.8 | 3.8 | 402 |
| TMB-EH | 1.4 | 2.5 | 365 |
| t-B-MP | | | |
| 2,5-MP | 3.7 | 5.0 | 395 |
| TMB-MP | 2.2 | 3.1 | 304 |
| t-B-P | 0.8 | 1.6 | 404 |
| 2,5-P | 0.2 | 1.0 | 379 |
| TMB-P | 0.1 | 1.0 | 358 |

TABLE IV.—180° F.-EXOTHERM DATA
[Commercial Resins]

| Peroxyester | Peroxide conc., percent by wgt. | Gel time, minutes | Cure time, minutes | Peak exotherm, °F |
|---|---|---|---|---|
| LAMINAC 4120 | | | | |
| t-B-IB | 0.5 | 8.0 | 9.6 | 360 |
| 2,5-IB | 0.5 | 5.5 | 6.8 | 386 |
| TMB-IB | 0.5 | 3.3 | 4.4 | 398 |
| t-B-EH | 0.5 | 5.7 | 7.1 | 384 |
| 2,5-EH | 0.5 | 3.9 | 5.1 | 382 |
| TMB-EH | 0.5 | 1.4 | 2.1 | 394 |
| PARAPLEX P-43 | | | | |
| t-B-IB | 1.0 | 7.9 | 9.4 | 390 |
| 2,5-IB | 1.0 | 3.1 | 4.5 | 400 |
| TMB-IB | 1.0 | 2.1 | 3.0 | 402 |
| t-B-EH | 1.0 | 3.4 | 5.0 | 393 |
| 2,5-EH | 0.5 | 3.9 | 5.7 | 396 |
| 2,5-EH | 1.0 | 2.3 | 3.6 | 395 |
| TMB-EH | 0.5 | 2.3 | 3.7 | 394 |
| TMB-EH | 1.0 | 1.0 | 1.8 | 390 |
| STYPOL 40-2224 | | | | |
| t-B-IB | 1.0 | 4.4 | 6.2 | 390 |
| 2,5-IB | 1.0 | 5.3 | 6.2 | 403 |
| TMB-IB | 1.0 | 3.6 | 4.5 | 394 |
| t-B-EH | 1.0 | 7.1 | 8.4 | 408 |
| 2,5-EH | 0.5 | 8.5 | 9.9 | 391 |
| 2,5-EH | 1.0 | 4.3 | 5.5 | 410 |
| TMB-EH | 0.5 | 4.5 | 5.9 | 394 |
| TMB-EH | 1.0 | 1.4 | 2.6 | 406 |
| KOPLAC V 3801-25 | | | | |
| t-B-IB | 1.0 | 7.5 | 9.5 | 372 |
| 2,5-IB | 1.0 | 5.3 | 6.4 | 396 |
| TMB-IB | 1.0 | 3.7 | 5.1 | 405 |
| t-B-EH | 1.0 | 5.5 | 6.8 | 384 |
| 2,5-EH | 0.5 | 7.0 | 9.0 | 378 |
| 2,5-EH | 1.0 | 4.1 | 5.0 | 384 |
| TMB-EH | 0.5 | 3.6 | 5.1 | 374 |
| TMB-EH | 1.0 | 1.6 | 2.7 | 386 |

It should be noted that in the exotherm tests that, Barcol Impressor readings, using a Model GYZj-934-1 instrument, were found to be equivalent in all cases within experimental error.

(iv) Half-life determination.—The half-life (t-½) of the α branched peroxyesters was determined by the method of Doehnert and Mageli, Modern Plastics, volume 36, number 6, pp. 142–148 (1959). Table V set out below allows a ready comparison of the compounds of this invention with prior art α branched peroxyesters. Each half-life was run using a benzene solution of the compound being evaluated; this solution having been made up to contain 0.2 mole of active oxygen. In this manner the difunctional peroxy compounds were equated to the monofunctional peroxides.

TABLE V.—HALF-LIFE OF α BRANCHED PEROXYESTERS

| Peroxyester | Temperature, °C. | Derivative of— | | |
|---|---|---|---|---|
| | | TMBH (t-½ hr.) | 2,5-H (t-½ hr.) | t-B-H (t-½ hr.) |
| Pivalate | 50 | 7.7 | 9.4 | 19.9 |
| | 70 | 0.65 | 0.7 | 1.6 |
| Isobutyrate | 60 | 29.8 | 51.0 | 100 |
| | 70 | 7.6 | 12.7 | 29.0 |
| | 85 | 1.3 | 1.9 | 3.6 |
| 2-ethylhexanoate | 60 | 10.5 | 21.1 | 59.0 |
| | 70 | 3.6 | 6.4 | 15.1 |
| | 80 | 1.4 | 2.0 | 4.4 |
| 2-ethylbutyrate | 70 | 4.9 | 8.0 | 15.9 |
| 2-methylpentanoate | 70 | 6.0 | 8.8 | 17.0 |

The data presented in the foregoing illustrative examples of polymerization reactions involving ethylenically unsaturated monomers, conclusively show that a nonobvious increase in activity and efficiency is obtained when the α branched peroxyesters of this invention are used as the polymerization initiators.

In the polymerization of styrene, the data set out in Table I, shows that the pivalate ester of TMBH provides a faster rate of polymerization and is a more efficient initiator than either prior art initiator t-B-P or 2,5-P.

It was also demonstrated in the example of vinyl chloride polymerization that on a weight basis, the order of effectiveness of the initiators would be:

TMB-P>2,5-P>t-B-P

Since a lesser amount of initiator would be needed to provide an equal percentage conversion to polyvinyl chloride, the commercial user is provided with an additional economic advantage when using the peroxyesters of this invention.

A still further illustration of the substantially increased activity of the α branched peroxyesters of this invention is provided by their use in the curing of unsaturated polyester resins. The gel time and cure time data set out in Tables III and IV, amply demonstrate that, in several representative commercial unsaturated polyester resins, as well as a "Standard" resin, the TMBH esters are more active, and still give an equivalent peak exotherm temperature. In all cases the gel and cure times are markedly shorter, thus affording industry a means of speeding up production with no sacrifice in the quality of the cured part.

Thus having described the invention what is claimed is:
1. Peroxyesters of the formula:

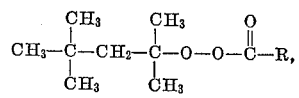

where, —R is an alkyl radical, branched at the alpha carbon position, having from 3 to 12 carbon atoms.
2. 1,1,3,3-tetramethylbutyl peroxyisobutyrate.
3. 1,1,3,3-tetramethylbutyl peroxy-2-ethylbutyrate.

4. 1,1,3,3-tetramethylbutyl peroxypivalate.
5. 1,1,3,3-tetramethylbutyl peroxy-2-methylpentanoate.
6. 1,1,3,3-tetramethylbutyl peroxy-2-ethylhexanoate.

References Cited

UNITED STATES PATENTS

| 2,661,363 | 12/1953 | Dickey | 260—453 |
| 2,698,863 | 1/1955 | Dickey | 260—453 |
| 3,214,422 | 10/1965 | Mageli et al. | |
| 3,264,274 | 8/1966 | Leveskis. | |

OTHER REFERENCES

Acott et al.: Australian Journal of Chemistry, volume 17, pp. 1342, 1350, 1352 (1964).

JOSEPH P. BRUST, *Primary Examiner.*

S. T. LAWRENCE III, *Assistant Examiner.*

U.S. Cl. X.R.

260—85.5, 85.7, 87.1, 87.3, 87.5, 87.7, 88.1, 88.2, 88.7, 89.1, 91.5, 92.8, 93.5, 94.9, 610